No. 706,926. Patented Aug. 12, 1902.
X. P. GILARDONI.
TILE PRESS.
(Application filed Nov. 12, 1901.)
(No Model.) 2 Sheets—Sheet 1.

WITNESSES
Thomas Kirkpatrick
H. Van Heerenbrinck

INVENTOR
Xavier Pierre Gilardoni
BY Alexander & Co
ATTORNEYS

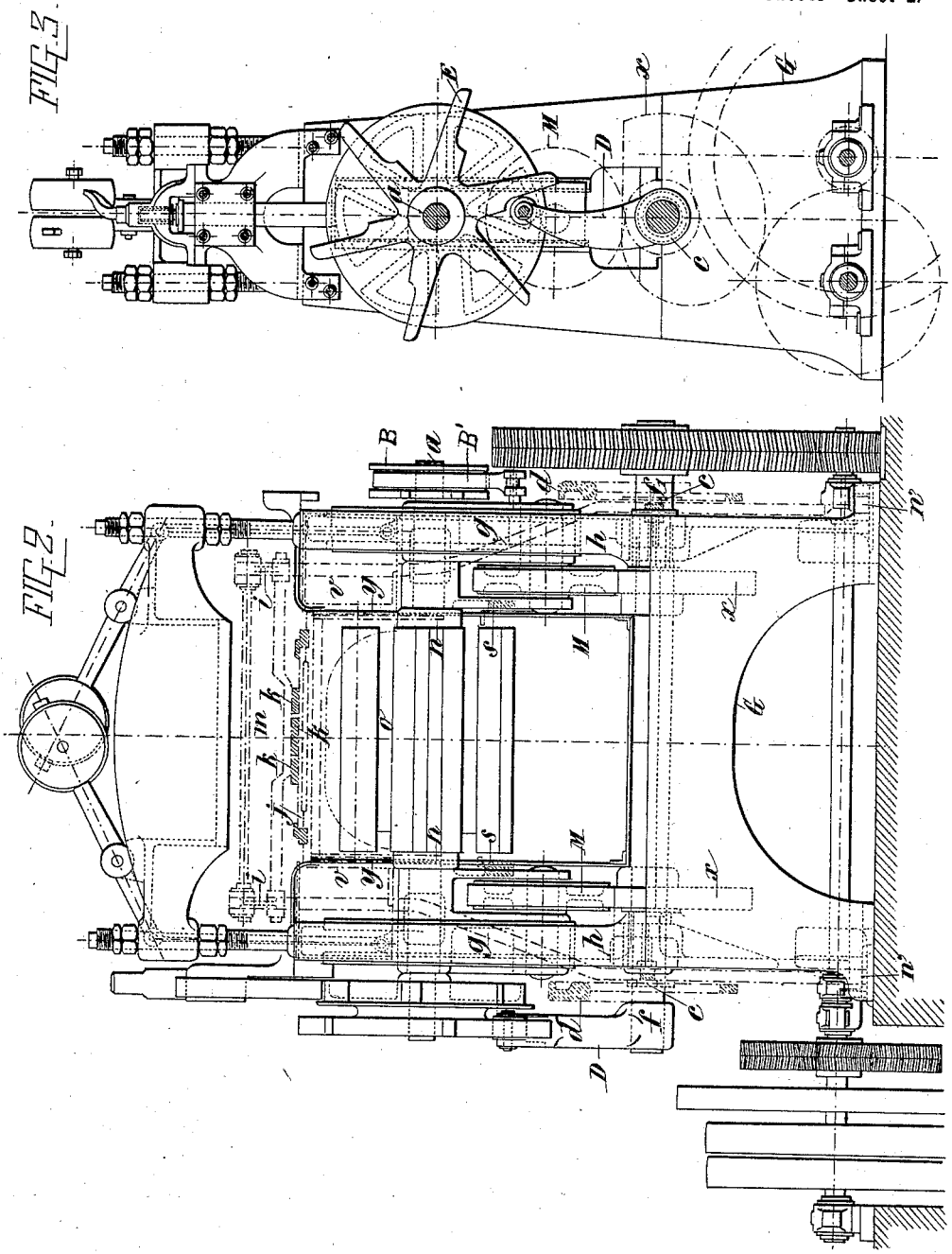

UNITED STATES PATENT OFFICE.

XAVIER PIERRE GILARDONI, OF CHOISY-LE-ROI, FRANCE, ASSIGNOR TO SE DITE GILARDONI FILS, A. BRAULT ET CIE., OF CHOISY-LE-ROI, FRANCE.

TILE-PRESS.

SPECIFICATION forming part of Letters Patent No. 706,926, dated August 12, 1902.

Application filed November 12, 1901. Serial No. 82,033. (No model.)

*To all whom it may concern:*

Be it known that I, XAVIER PIERRE GILARDONI, engineer, a citizen of the Republic of France, and a resident of Choisy-le-Roi, in the Republic of France, have invented a new and useful Improvement in or Relating to Tile-Presses, which is fully set forth in the following specification.

The present invention relates to a construction of steam-presses for the manufacture of tiles which are provided in longitudinal and transverse directions with grooves and ribs constituting the joints and lapping portions as well as the interior grooves forming the hollow portion of the tiles.

Figure 1:
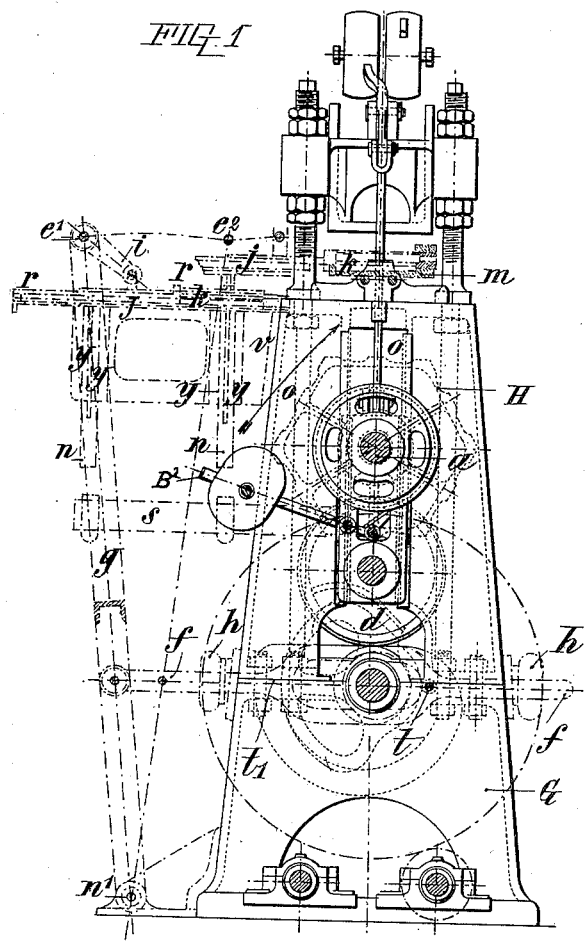
Figure 4:
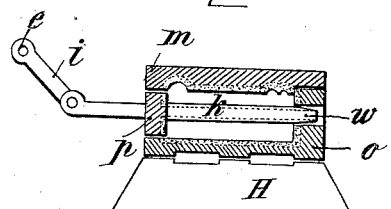

In the accompanying drawings, Figure 1 is a side elevation of the right-hand side of a machine according to this invention. Fig. 2 is a front elevation of the same. Fig. 3 is a side view of the left-hand side of the press, and Fig. 4 shows the construction of the two halves of the molds and of the molding device for the internal grooves.

Upon the lateral parts of a solid frame G are provided spaces which serve as guides for the vertical reciprocation of movable slides. The slides form the supports of a shaft $a$, Figs. 1 and 3, carrying a multi-angular roller H with five, six, or more sides or faces, each of which serves as a support of a semimold $o$, Fig. 4, the upper half $m$ of which is fixed upon the top of the press and just opposite to the lower half-mold. Upon the shaft $a$ is also rigidly mounted a star-wheel with six arms E, Fig. 3, with which engages a cam D, provided at its end with a roller and connected to the operating mechanism by any suitable transmission mechanism, Figs. 1 and 3. The shaft $c$, which carries the cam, also carries other cams $x$, engaging large friction-rollers M, arranged parallel to the slides above mentioned, these cams in their rotation raising and lowering the friction-rollers, together with the slides and the angle-roller H. Arms S, Figs. 1 and 2, secured to the slides, participate also in this rising movement, and thereby raise the arms $n$ of a table $r$, which in this manner is moved vertically in guides $v$ $v$ of the frame $y$. The table $r$ carries the fork or device for forming the grooves in the tiles. The rotary prism H is stopped in proper position after rotation by cam D by means of a brake-wheel B on shaft $a$, which wheel is engaged by the brake-band B', connected, as usual, to the pivoted weighted brake-lever B².

On the side of the frame G are arranged arms $f$ $f'$, Fig. 1, which slide horizontally in the guides $h$ $h$, fixed upon the frame, and which are acted upon by a cam $d$, which has a circular motion between two stops or tappets $t$ $t'$, fixed upon the arms $f$ $f'$. Under the action of the cam $d$ and arms $f$ $f'$ rocking arms $g$, pivoted at $n'$, and levers $i$, connected to their upper ends, receive a motion by which they are moved nearer to or farther away from the frame of the machine, with the object of introducing or withdrawing the fork $j$. The approach of the fork is effected during the ascent of the lower mold and of the angle-roller or prism which carries it, while the withdrawal of the fork is accomplished after the pressing operation and before the lower prism has commenced its descending movement. For this purpose the cams are suitably shaped.

The operation of the machine is as follows: On the face of the prism or angle-roller H in front of the machine—i. e., at the side of the pivoted arms or levers $g$—is placed a block of clay of a slightly-larger size than the finished product and having as many perforations as the number of teeth of the fork. These perforations give to the cake the approximate shape of the finished tile. The cam D then causes the star-wheel E to make a sixth of a revolution in the backward direction, and consequently the prism turns in the same direction through an equal angle corresponding to one-sixth of a revolution. As soon as this rotation is complete under the action of the cam D the friction-rollers M, Fig. 2, engage with the cams $x$, whereupon the rollers, slides, and the prismatic carrier, as well as the lower mold, ascend in a vertical direction. At a point of this ascending motion the horizontal arms $s$ come in contact with the vertical arms $n$ of the table $r$, whereupon the latter also partakes in the ascending motion. At the same time the pivoted arms or levers $g$ oscillate inward, or to the right, until the pivots $e'$, connecting them to the levers $i$, coincide with the point $e^2$, as shown in Fig. 1. In consequence of this movement the lever $i$ has pushed the fork $j$ in the mold in such a manner that the introduction of the fork into the grooves of the block is finished before the pressure of the angular roller or prism and its half-mold upon the other half-mold fixed on the top of the press is effected. The pressure being once effected the pivoted levers are swiftly moved backward through the operation of the horizontal arms $f f'$ and their operating-cams in such a manner that the fork is withdrawn from the mold before the prism commences its downward movement. This latter operation is then effected, and during the end of the movement the star-wheel E, Fig. 4, causes the prism to rotate, which brings a fresh cake upon the upper part. At the same time the pressed tile appears on the opposite side to that through which the cake was introduced and is removed by means of a suitable carrier, as in ordinary machines.

Fig. 4 shows the prism H in its most elevated position. In this position the horizontal part $o$, constituting the lower part of the mold, forms, with the upper stationary part $m$ and the collar $p$ of the teeth of the fork, a complete closed mold. The teeth $k$ of the fork are conically finished off or beveled at their ends $w$ in order to facilitate their withdrawal, and the upper and lower parts are provided with the necessary grooves and projections for the production of joints and laps of the tile. The half-molds may be of cast-iron covered with a plaster of the desired thickness, as is usual for the ordinary molding of tiles in soft clay.

The invention effects an improvement of the greatest importance in the manufacture of tiles, owing to the fact that with one and the same pressure action joining and lapping tiles of all shapes can be obtained, provided at the same time at their lower part with thin walls forming plasters, puggings, or ceilings under roofs, formed by the titles themselves under conditions which no other system has yet realized.

I claim—

1. A tile-press comprising, a frame, a mold-section carried thereby, a rotary mold-carrier adapted to carry a plurality of mold-sections, means for rotating the mold-carrier at intervals, means for raising and lowering the mold-carrier toward and from the first-named mold-section, a molding-fork coacting with the mold-sections and means for actuating the said fork, substantially as described.

2. A tile-press comprising, a frame, a stationary mold-section, vertically-movable slides mounted in the sides of the frame, a horizontal rotary polygonal mold-carrier mounted in said slides, means for rotating said polygonal mold-carrier to bring its faces successively under the stationary mold-section, means for raising the said carrier toward the fixed mold at intervals a molding-fork movable vertically with the said carrier and also movable horizontally to coact with the mold-sections, and means for so actuating said fork; substantially as described.

3. A tile-press comprising, a frame, a stationary mold-section thereon, vertically-movable slides on the frame, a polygonal mold-carrier journaled in said slides and provided with an operating star-wheel, a shaft provided with a cam for rotating the star-wheel to bring its faces successively under the fixed mold, and also provided with means for raising and lowering the polygonal mold; substantially as described.

4. A tile-press comprising, a frame, a mold-section thereon, a rotary polygonal mold-carrier, vertically-sliding bearings for said carrier, means for rotating the carrier to bring its faces successively under the first-named mold-section, means for raising and lowering the carrier, and a molding-fork coacting with the said molding-sections and means for actuating the fork; substantially as described.

5. A tile-press comprising, the frame, the upper mold-section, the polygonal mold-carrier therebelow, means for rotating the carrier to bring its successive faces under said mold-section, means for raising and lowering the polygonal carrier, a vertically-movable table, means for automatically raising and lowering the table, a horizontally-movable molding-fork mounted on said table, swinging arms or levers for moving the fork toward and from the mold-sections and a cam mechanism timed to actuate the fork; substantially as and for the purpose set forth.

In testimony whereof I have signed this specification in the presence of two subscribing witnesses.

XAVIER PIERRE GILARDONI.

Witnesses:
EMILE LEOBRET,
EDWARD P. MACLEAN.